United States Patent
Hama et al.

(10) Patent No.: US 10,599,933 B2
(45) Date of Patent: Mar. 24, 2020

(54) BIOMETRIC IMAGE CAPTURING APPARATUS AND BIOMETRIC IMAGE CAPTURING METHOD

(71) Applicant: FUJITSU LIMITED, Kawasaki-shi, Kanagawa (JP)

(72) Inventors: Soichi Hama, Atsugi (JP); Takahiro Aoki, Kawasaki (JP); Isao Iwaguchi, Inagi (JP)

(73) Assignee: FUJITSU LIMITED, Kawasaki (JP)

( * ) Notice: Subject to any disclaimer, the term of this patent is extended or adjusted under 35 U.S.C. 154(b) by 217 days.

(21) Appl. No.: 15/277,544

(22) Filed: Sep. 27, 2016

(65) Prior Publication Data

US 2017/0091568 A1    Mar. 30, 2017

(30) Foreign Application Priority Data

Sep. 30, 2015   (JP) .................. 2015-193434

(51) Int. Cl.
    *G06K 9/00*    (2006.01)
    *G06K 9/46*    (2006.01)
    (Continued)

(52) U.S. Cl.
    CPC ....... *G06K 9/00892* (2013.01); *G06K 9/0012* (2013.01); *G06K 9/4604* (2013.01);
    (Continued)

(58) Field of Classification Search
    CPC ............. G06K 9/00892; G06K 9/0012; G06K 9/6215; G06K 9/52; G06K 9/4604; G06T 7/13; G06T 7/60; H04N 5/2256
    (Continued)

(56) References Cited

U.S. PATENT DOCUMENTS

| 5,077,803 A | 12/1991 | Kato et al. |
| 7,415,140 B2 * | 8/2008 | Nagahashi ......... G06K 9/00248 348/77 |

(Continued)

FOREIGN PATENT DOCUMENTS

| JP | 2-79181 | 3/1990 |
| JP | 2003-30659 | 1/2003 |

(Continued)

OTHER PUBLICATIONS

Extended European Search Report dated Feb. 16, 2017 in corresponding European Patent Application No. 16190788.6.

(Continued)

*Primary Examiner* — Susan E. Hodges
(74) *Attorney, Agent, or Firm* — Staas & Halsey LLP (57) ABSTRACT

A biometric image capturing apparatus includes an irradiating unit configured to irradiate a subject with light, a camera configured to capture an image of the subject, a polarizing unit which is disposed on an optical path between the irradiating unit and the camera, and configured to allow passage of light in a first polarization direction and light in a second polarization direction, a processor configured to perform computation using a first image captured by the camera according to the light in the first polarization direction that has passed through the polarizing unit and a second image captured by the camera according to the light in the second polarization direction that has passed through the polarizing unit, and to determine whether the subject is a biological body according to a result of the computation performed by the computing unit.

6 Claims, 11 Drawing Sheets

(51) Int. Cl.
- *G06T 7/00* (2017.01)
- *H04N 7/18* (2006.01)
- *G06F 21/32* (2013.01)
- *G06T 7/13* (2017.01)
- *G06K 9/52* (2006.01)
- *G06K 9/62* (2006.01)
- *G06T 7/60* (2017.01)
- *H04N 5/225* (2006.01)

(52) U.S. Cl.
CPC ............. *G06K 9/52* (2013.01); *G06K 9/6215* (2013.01); *G06T 7/13* (2017.01); *G06T 7/60* (2013.01); *H04N 5/2256* (2013.01)

(58) Field of Classification Search
USPC .......................................................... 348/77
See application file for complete search history.

(56) References Cited

U.S. PATENT DOCUMENTS

| | | | | |
|---|---|---|---|---|
| 7,545,963 | B2* | 6/2009 | Rowe | G06K 9/00033 340/5.53 |
| 7,899,217 | B2* | 3/2011 | Uludag | G06K 9/00046 340/5.53 |
| 2003/0012413 | A1 | 1/2003 | Kusakari et al. | |
| 2005/0205667 | A1* | 9/2005 | Rowe | A61B 5/1171 235/382 |
| 2005/0265585 | A1 | 12/2005 | Rowe | |
| 2006/0062438 | A1* | 3/2006 | Rowe | G06K 9/00046 382/124 |
| 2007/0211926 | A1* | 9/2007 | Shinzaki | G06K 9/00107 382/124 |
| 2008/0025579 | A1 | 1/2008 | Sidlauskas et al. | |
| 2008/0219522 | A1* | 9/2008 | Hook | G06K 9/0012 382/124 |
| 2011/0064282 | A1* | 3/2011 | Abramovich | G06K 9/00033 382/124 |
| 2011/0150334 | A1* | 6/2011 | Du | G06K 9/00604 382/173 |
| 2011/0200237 | A1* | 8/2011 | Nakamura | A61B 5/1171 382/127 |
| 2011/0243396 | A1 | 10/2011 | Hama et al. | |
| 2016/0125178 | A1* | 5/2016 | Danikhno | G06F 21/32 726/18 |

FOREIGN PATENT DOCUMENTS

| | | |
|---|---|---|
| JP | 2003-331268 | 11/2003 |
| JP | 3721165 | 9/2005 |
| JP | 2007-37652 | 2/2007 |
| JP | 2008-99783 | 5/2008 |
| JP | 2008-148862 | 7/2008 |
| JP | 2010-218259 | 9/2010 |
| JP | 2013-3735 | 1/2013 |
| JP | 5287868 | 6/2013 |

OTHER PUBLICATIONS

Kristin A. Nixon et al., "Multispectral Fingerprint Imaging for Spoof Detection", Biometric Technology for Human Identification II, vol. 5779, SPIE, Mar. 2005, pp. 214-225.

Japanese Office Action for corresponding Japanese Application No. 2015-193434 dated Apr. 9, 2019.

* cited by examiner

| -1 | -2 | -1 |
|---|---|---|
| 0 | 0 | 0 |
| 1 | 2 | 1 |

702-1
DIFFERENCE IN GRADATION FOR DIRECTION FROM BOTTOM TO TOP

| 1 | 2 | 1 |
|---|---|---|
| 0 | 0 | 0 |
| -1 | -2 | -1 |

702-2
DIFFERENCE IN GRADATION FOR DIRECTION FROM TOP TO BOTTOM

| -1 | 0 | 1 |
|---|---|---|
| -2 | 0 | 2 |
| -1 | 0 | 1 |

702-3
DIFFERENCE IN GRADATION FOR DIRECTION FROM RIGHT TO LEFT

| 1 | 0 | -1 |
|---|---|---|
| 2 | 0 | -2 |
| 1 | 0 | -1 |

702-4
DIFFERENCE IN GRADATION FOR DIRECTION FROM LEFT TO RIGHT

| -2 | -1 | 0 |
|---|---|---|
| -1 | 0 | 1 |
| 0 | 1 | 2 |

702-5
DIFFERENCE IN GRADATION FOR DIRECTION FROM BOTTOM RIGHT TO TOP LEFT

| 2 | 1 | 0 |
|---|---|---|
| 1 | 0 | -1 |
| 0 | -1 | -2 |

702-6
DIFFERENCE IN GRADATION FOR DIRECTION FROM TOP LEFT TO BOTTOM RIGHT

| 0 | 1 | 2 |
|---|---|---|
| -1 | 0 | 1 |
| -2 | -1 | 0 |

702-7
DIFFERENCE IN GRADATION FOR DIRECTION FROM TOP RIGHT TO BOTTOM LEFT

| 0 | -1 | -2 |
|---|---|---|
| 1 | 0 | -1 |
| 2 | 1 | 0 |

702-8
DIFFERENCE IN GRADATION FOR DIRECTION FROM TOP LEFT TO BOTTOM RIGHT

BIOMETRIC IMAGE CAPTURING APPARATUS AND BIOMETRIC IMAGE CAPTURING METHOD

CROSS-REFERENCE TO RELATED APPLICATION

This application is based upon and claims the benefit of priority of the prior Japanese Patent Application No. 2015-193434, filed on Sep. 30, 2015, the entire contents of which are incorporated herein by reference.

FIELD

The embodiments discussed herein are related to a biometric image capturing apparatus and a biometric image capturing method.

BACKGROUND

Biometric authentication techniques rely on biometric features inseparable from a person. Hence, they are said to involve lower risks of theft and forgery than identity verifications based on a person's memory, such as a personal identification number or a password, or identity verifications based on objects, such as a seal or a card. However, a possibility of "spoofing" has been pointed out in which a third person fraudulently obtains a biometric feature and completes authentication using a counterfeit of the feature.

Accordingly, to achieve a high security level with biometric authentication, it is necessary to determine whether an object observed to obtain a feature is a biological body or is a counterfeit (non-biological body). For this, various techniques have been disclosed.

In a known technique, a finger is irradiated with spot-like light of linearly polarized light, and reflected light is polarization-separated to determine whether the object is a biological body in accordance with the ratio between surface-reflected light and internally diffused light (see, for example, Japanese Laid-open Patent Publication No. 2-79181). A known biometric authentication apparatus is capable of switching between vein authentication and fingerprint authentication (see, for example, Japanese Laid-open Patent Publication No. 2010-218259).

The conventional technique relying on spot-like light to determine whether an object is a biological body is based on the premise that reflected light from the spot-like light is incident on a detector. However, in a case where a palm is an object to be detected, surface-reflected light does not necessarily accurately reach the detector because the palm has a complicated concavo-convex shape and the posture is unstable when the hand is held over the detector in a noncontact manner. This may cause a problem wherein it is not correctly determined whether an object to be detected is a biological body.

SUMMARY

According to an aspect of the invention, a biometric image capturing apparatus includes an irradiating unit, a polarizing unit, a camera, and a processor.

The irradiating unit irradiates a subject with light.

The camera captures an image of the subject.

The polarizing unit is disposed on an optical path between the irradiating unit and the camera and allows passage of light in a first polarization direction and light in a second polarization direction.

The processor performs computation using a first image captured by the camera according to the light in the first polarization direction that has passed through the polarizing unit and a second image captured by the camera according to the light in the second polarization direction that has passed through the polarizing unit.

the processor determines whether the subject is a biological body according to a result of the computation.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

The following describes embodiments with reference to the drawings.

Figure 1:
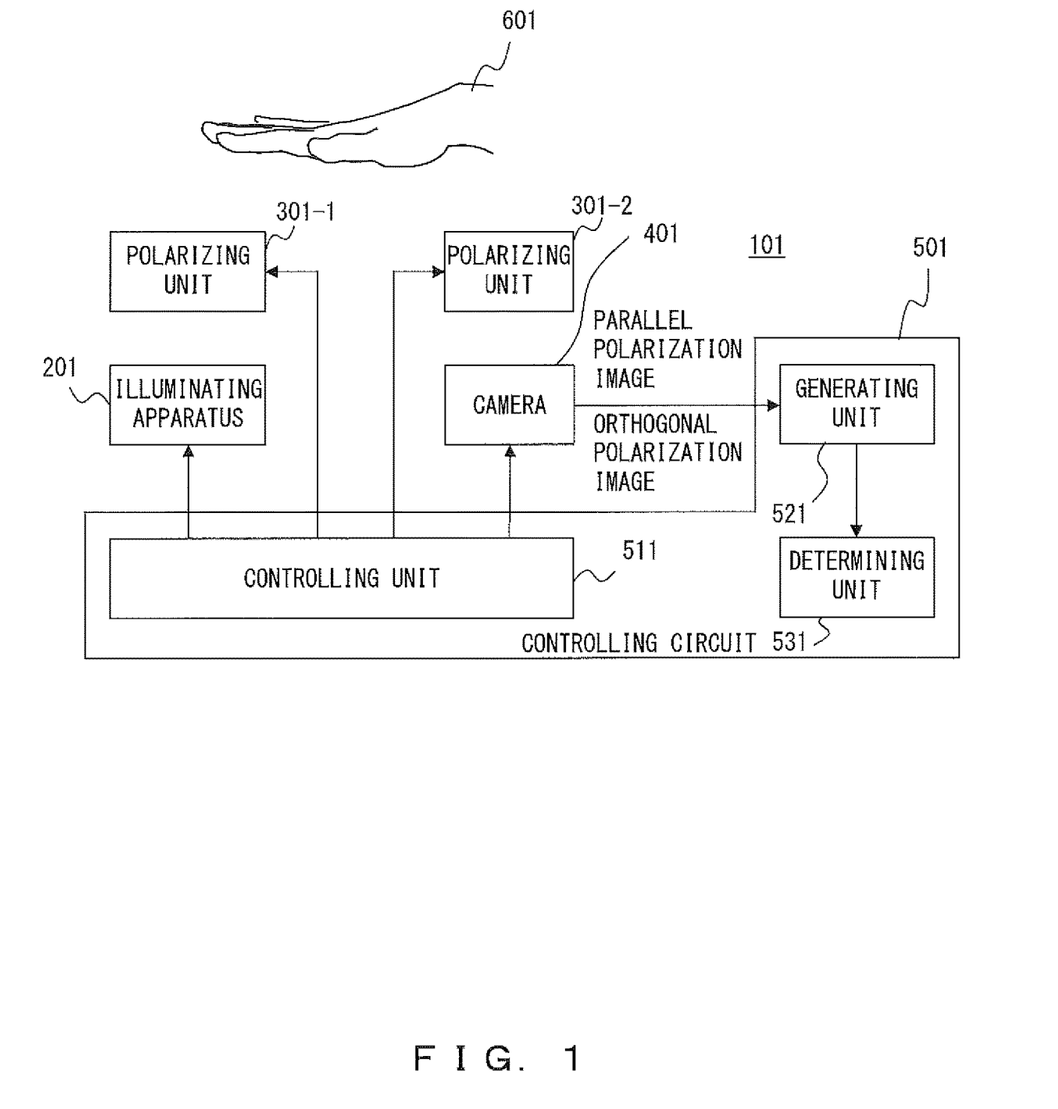
FIG. 1 is a configuration diagram of a biometric image capturing apparatus in accordance with an embodiment.

FIG. 1 is a configuration diagram of a biometric image capturing apparatus in accordance with an embodiment.

A biometric image capturing apparatus 101 includes an illuminating apparatus 201, polarizing units 301-$i$ ($i=1, 2$), a camera 401, and a controlling circuit 501. The biometric image capturing apparatus 101 is applied to, for example, a biometric authentication (biometrics authentication) apparatus that performs identity verification in a non-contact manner using a biometric feature such as palm veins.

The illuminating apparatus 201 irradiates a subject 601 with light. Light emitted by the illuminating apparatus 201 is, for example, an infrared ray or visible light. The illuminating apparatus 201 is an exemplary light source. One or more illuminating apparatuses 201 may be provided.

The polarizing unit 301-$i$ is, for example, a polarizing filter or a polarization beam splitter. The polarizing unit 301-$i$ allows passage of only light in a particular polarization direction. That is, light that has passed through the polarizing unit 301-$i$ becomes linearly polarized light. The polarizing unit 301-1 is disposed on an optical path between the illuminating apparatus 201 and the subject 601 and allows passage of only light in a particular polarization direction that has been set for the polarizing unit 301-1 from among the light emitted from the illuminating apparatus 201. One or more polarizing units 301-1 may be provided; for example, the number of polarizing units 301-1 may be equal to the number of illuminating apparatuses 201. The polarizing unit 301-2 is disposed on an optical path between the subject 601 and the camera 401 and allows passage of only light in a particular polarization direction that has been set for the polarizing unit 301-2 from among the reflected light from the subject 601. The polarization direction of the polarizing unit 301-2 is, for example, parallel to (i.e., identical with), or orthogonal to, that of the polarizing unit 301-1.

The camera 401 captures and outputs a parallel polarization image and orthogonal polarization image of the subject 601 to a generating unit 521. The parallel polarization image is an image captured via the polarizing unit 301-2 whose polarization direction is identical with that of the polarization unit 301-1. The orthogonal polarization image is an image captured via the polarizing unit 301-2 whose polarization direction is orthogonal to that of the polarization unit 301-1. One or more cameras 401 may be provided. In an embodiment, the parallel polarization image and the orthogonal polarization image are gray-scale images.

The controlling circuit 501 includes a controlling unit 511, a generating unit 521, and a determining unit 531. The controlling circuit 501 may be achieved by, for example, a Large Scale Integration (LSI), an Application Specific Integrated Circuit (ASIC), or a Field-Programmable Gate Array (FPGA). A Central Processing Unit (CPU) may read a program from, for example, a memory, and may execute the program so as to achieve a function of the controlling circuit 501.

The controlling unit 511 controls the illuminating apparatus 201, the polarizing units 301-$i$, and the camera 401. When, for example, the camera 401 captures an image of the subject 601, the controlling unit 511 causes the illuminating apparatus 201 to emit light. When, for example, the polarizing unit 301-$i$ is a rotatable polarizing filter, the controlling unit 511 changes a polarization direction by rotating the polarizing filter so as to capture a parallel polarization image or an orthogonal polarization image. When the polarization direction of the polarizing filter is fixed, the controlling unit 511 does not need to control the polarizing filter.

The generating unit 521 performs computation for a parallel polarization image and an orthogonal polarization image. In particular, the generating unit 521 calculates a difference between the pixel value of each pixel of the parallel polarization image and the pixel value of each pixel of the orthogonal polarization image, and generates a difference image of pixels each with a pixel value equal to the calculated difference. Alternatively, the generating unit 521 divides the pixel value of each pixel of the parallel polarization image by the pixel value of each pixel of the orthogonal polarization image, and generates a division image that is a value resulting from the division of the pixel values of pixels. To generate a division image, the pixel value of each pixel of the orthogonal polarization image may be divided by the pixel value of each pixel of the parallel polarization image. The generating unit 521 is an example of a calculating unit. The generating unit 521 is an example of the computing unit.

The determining unit 531 performs edge detection on a difference image or a division image and determines whether a determination target is a biological body according to a result of the edge detection.

The subject 601 is, for example, a real hand, a biological body, or a replica (imitation) of a hand, a non-biological body. In an embodiment, the subject 601 is a real palm or a replica of a palm; the illuminating apparatus 201 irradiates a palm with an infrared ray; the camera 401 captures an image of the palm.

Figure 2:
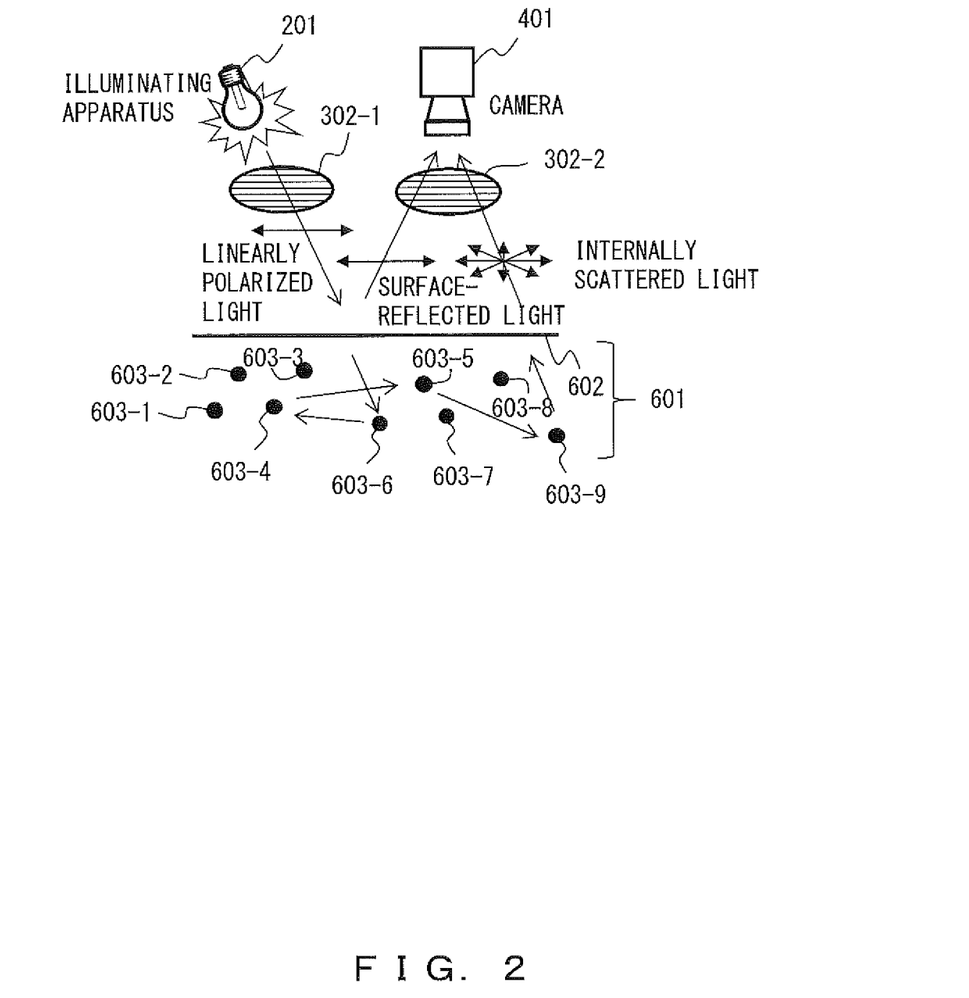
FIG. 2 illustrates reflected light obtained when a biological body is irradiated with linearly polarized light.

FIG. 2 illustrates reflected light obtained when a biological body is irradiated with linearly polarized light.

Polarizing filters 302-1 and 302-2 in FIG. 2 correspond to the polarizing units 301-1 and 301-2 in FIG. 1.

As illustrated in FIG. 2, the illuminating apparatus 201 emits linearly polarized light traveling to the polarizing filter 302-1 to irradiate a biological body, i.e., the subject 601.

Biological bodies such as fingers and hands have a multilayer structure consisting of skin and an internal structure so that their appearance can be represented by a dichromatic reflection model. That is, returning light from irradiation of an object with light is a mixture of light reflected from the surface and light returning after being diffused inside.

Light reflected from a skin surface 602 of the biological body (surface-reflected light) is reflected while maintaining a polarization state. Meanwhile, linearly polarized light that has entered the biological body is diffused by body tissues 603-$j$ ($j$=1 to 9) such as fat and becomes composite light with irregularly changed polarization states (internally scattered light). Accordingly, in a case where an observation is performed under a condition in which the polarizing filter 302-2 is placed in front of the camera, when the polarization direction of the polarizing filter 302-1, i.e., a filter on the illumination side, is parallel to the polarization direction of the polarizing filter 302-2, i.e., a filter on the camera side, components of surface-reflected light and internally scattered light that are parallel to linearly polarized light are observed; when the polarization directions are orthogonal to each other, surface-reflected components are blocked, and components orthogonal to linearly polarized light of internally diffused light are observed.

When a parallel polarization image and an orthogonal polarization image each with a different polarization state that have been captured by the biometric image capturing apparatus 101 in FIG. 1 are compared with each other, these two polarization images indicate different luminance distributions because a biological body indicates a dichromatic reflection property resulting from surface-reflected light and internally diffused light. However, in the case of a non-biological body, two polarization images indicate the same luminance distribution. Using a difference in distribution, the biometric image capturing apparatus 101 determines whether an object is a biological body. In this way, the biometric image capturing apparatus 101 determines whether a subject is a biological body according to the distribution of the polarization state of reflected light based on the polarization property of skin (anisotropic scattering).

In the following a plurality of exemplary configurations of the biometric image capturing apparatus 101 for capturing images in two different polarization states (a parallel polarization image and an orthogonal polarization image) are discussed.

Figure 3:
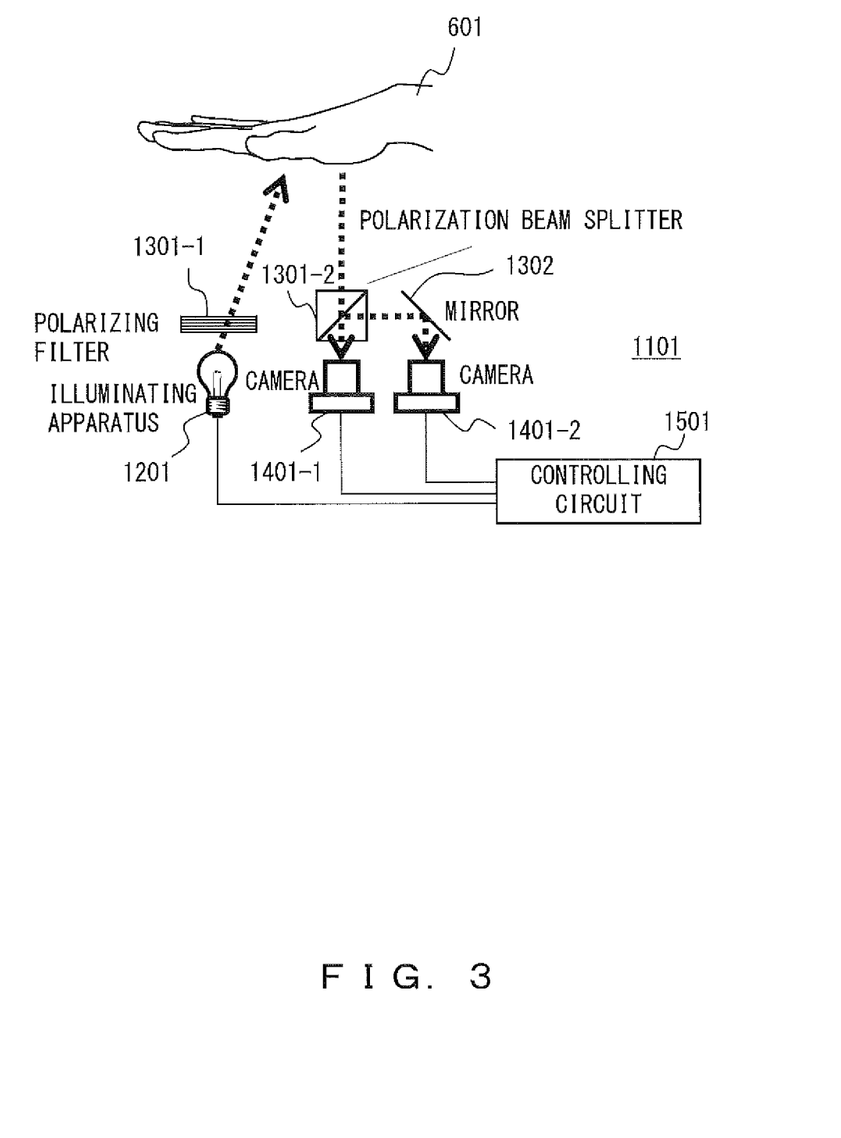
FIG. 3 illustrates a first exemplary configuration of a biometric image capturing apparatus in accordance with an embodiment.

FIG. 3 illustrates a first exemplary configuration of a biometric image capturing apparatus in accordance with an embodiment.

A biometric image capturing apparatus 1101 includes an illuminating apparatus 1201, a polarizing filter 1301-1, a polarization beam splitter 1301-2, a mirror 1302, cameras **1401-*i*, and a controlling circuit 1501**.

The illuminating apparatus 1201, the polarization beam splitter 1301, the mirror 1302, the cameras **1401-*i*, and the controlling circuit 1501 respectively correspond to the illuminating apparatus 201, the polarizing unit 301-1, the polarizing unit 301-2, the camera 401, and the controlling circuit 501 in FIG. 1**.

The illuminating apparatus 1201 emits linearly polarized light traveling to the polarizing filter 1301-1 to irradiate the subject 601.

The polarization beam splitter 1301-2 separates reflected light from the subject 601 into two orthogonal polarized components, and outputs two rays of linearly polarized light that are orthogonal to each other. That is, the polarization beam splitter 1301-2 has two different optical paths each with a different polarization direction. The polarization direction of one of the two rays of linearly polarized light is parallel to the polarization direction of the polarizing filter 1301-1, and this one ray enters the camera 1401-1.

The polarization direction of the other of the two rays of linearly polarized light is orthogonal to the polarization direction of the polarizing filter 1301-1, and the other ray of linearly polarized light is reflected from the mirror 1302 and enters the camera 1401-2.

As a result, the camera 1401-1 captures a parallel polarization image, and the camera 1401-2 captures an orthogonal polarization image. The cameras **1401-*i* output the captured images to the controlling circuit 1501. According to the parallel polarization image and the orthogonal polarization image, the controlling circuit 1501** determines whether the subject is a biological body.

The biometric image capturing apparatus 1101 with the first exemplary configuration can concurrently capture images of two polarization states using the polarization beam splitter 1301.

Figure 4:
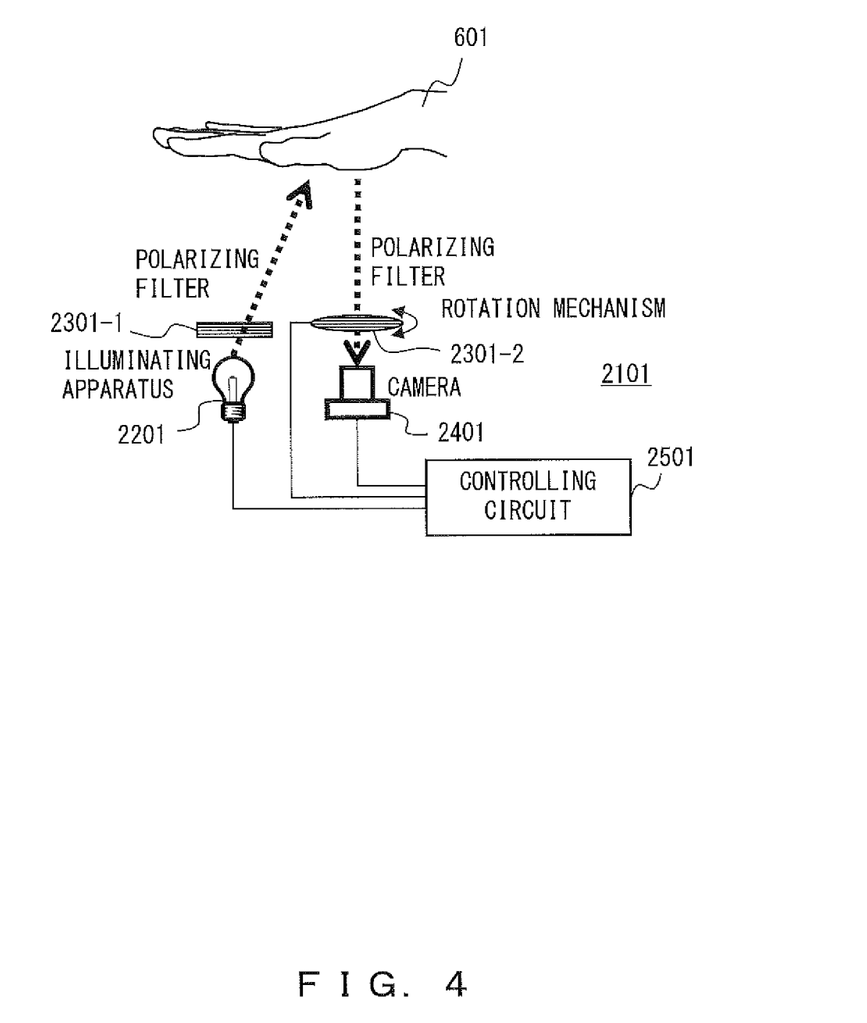
FIG. 4 illustrates a second exemplary configuration of a biometric image capturing apparatus in accordance with an embodiment.

FIG. 4 illustrates a second exemplary configuration of an image capturing apparatus in accordance with an embodiment.

A biometric image capturing apparatus 2101 includes an illuminating apparatus 2201, polarizing filters **2301-*i*, cameras 2401-*i*, and a controlling circuit 2501**.

The illuminating apparatus 2201, the polarizing filter 2301-1, the polarizing filter 2301-2, the camera 2401, and the controlling circuit 2501 respectively correspond to the illuminating apparatus 201, the polarizing unit 301-1, the polarizing unit 301-2, the camera 401, and the controlling circuit 501 in FIG. 1.

The illuminating apparatus 2201 emits linearly polarized light traveling to the polarizing filter 2301-1 to irradiate the subject 601.

Reflected light from the subject 601 passes through the polarizing filter 2301-2 and enters the camera 2401, which captures an image of the subject 601 and outputs the captured image to the controlling circuit 2501.

The polarizing filter 2301-2 is rotatable. The polarization filter 2301-2 rotates under the control of the controlling circuit 2501, and provides a polarization direction settable in accordance with a rotation angle.

The controlling circuit 2501 makes the polarization direction of the polarizing filter 2301-2 parallel to the polarizing filter 2301-1, and causes the camera 2401 to capture an image of the subject 601, thereby capturing a parallel polarization image. Next, the controlling circuit 2501 makes the polarization direction of the polarizing filter 2301-2 orthogonal to the polarizing filter 2301-1, and causes the camera 2401 to capture an image of the subject 601, thereby capturing an orthogonal polarization image. The difference between respective times at which are captured the parallel polarization image and the orthogonal polarization image is made to be as small as possible.

According to the parallel polarization image and the orthogonal polarization image, the controlling circuit 2501 determines whether the subject is a biological body.

In the biometric image capturing apparatus 2101 described above, the polarizing filter 2301-2 on the camera side rotates. However, the polarizing filter 2301-1 on the illuminating-apparatus side may be rotatable and the polarization direction thereof may be changeable, while the polarization direction of the polarizing filter 2301-2 on the camera side may be fixed. In this case, the controlling circuit 2501 makes the polarization direction of the polarizing filter 2301-1 parallel to the polarizing filter 2301-2, and causes the camera 2401 to capture an image of the subject 601, thereby capturing a parallel polarization image. Next, the controlling circuit 2501 makes the polarization direction of the polarizing filter 2301-1 orthogonal to the polarizing filter 2301-2, and causes the camera 2401 to capture an image of the subject 601, thereby capturing an orthogonal polarization image.

In the biometric image capturing apparatus 2101 described above, the polarizing filter 2301-2 rotates. However, in one possible method, a plurality of polarizing filters each with a different polarization direction (e.g., a polarizing filter with the same polarization direction as the polarizing filter 2301-1, and a polarizing filter with a polarization direction orthogonal to that of the polarizing filter 2301-1) may be placed next to each other, and these polarizing filters may be slid for the purpose of switching between them for a polarizing filter through which reflected light from the subject 601 passes.

In the biometric image capturing apparatus 2101 with the second exemplary configuration, one camera can capture two polarization images.

Figure 5:
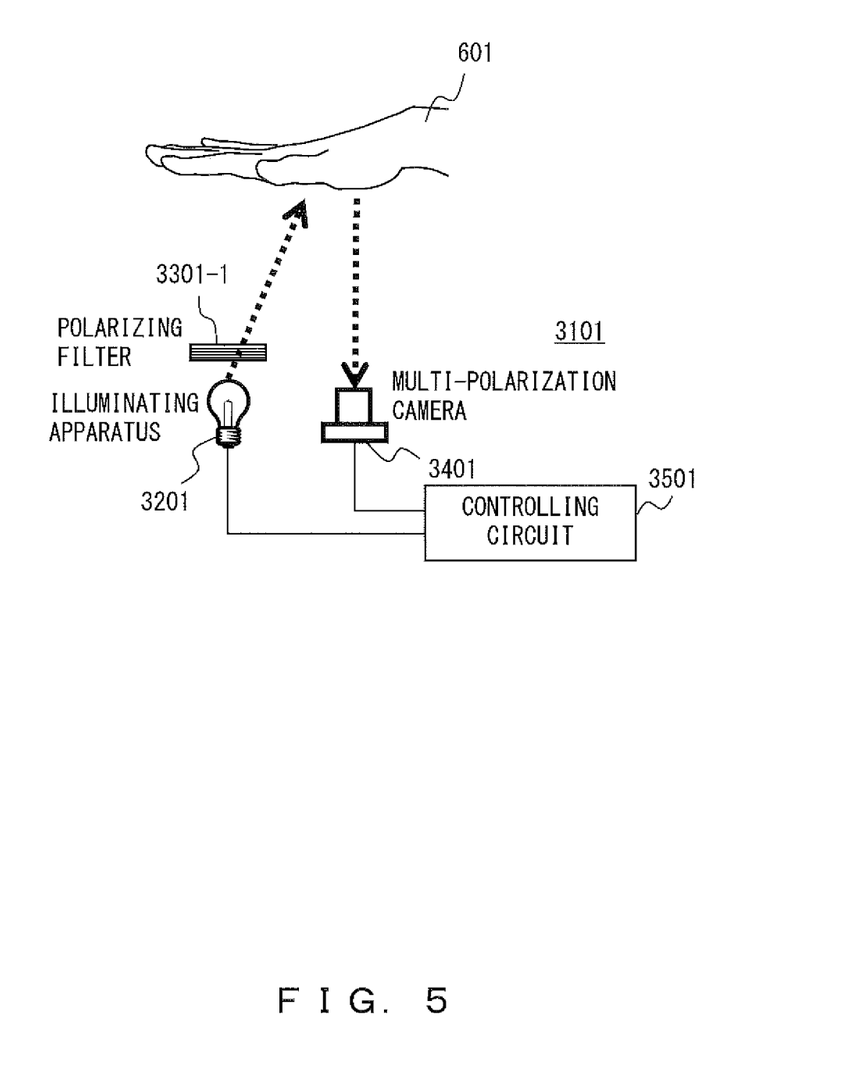
FIG. 5 illustrates a third exemplary configuration of a biometric image capturing apparatus in accordance with an embodiment.

FIG. 5 illustrates a third exemplary configuration of an image capturing apparatus in accordance with an embodiment.

A biometric image capturing apparatus 3101 includes an illuminating apparatus 3201, a polarizing filter 3301-1, a multi-polarization camera 3401, and a controlling circuit 3501.

The illuminating apparatus 3201, the polarizing filter 3301-1, and the controlling circuit 3501 respectively correspond to the illuminating apparatus 201, the polarizing unit 301-1, and the controlling circuit 501 in FIG. 1. The multi-polarization camera 3401 corresponds to the polarizing unit 301-2 and the camera 401.

The illuminating apparatus 3201 emits linearly polarized light traveling to the polarizing filter 3301-1 to irradiate the subject 601.

Reflected light from the subject 601 enters the multi-polarization camera 3401, which captures an image of the subject 601 and outputs the captured image to the controlling circuit 3501.

Figure 6:
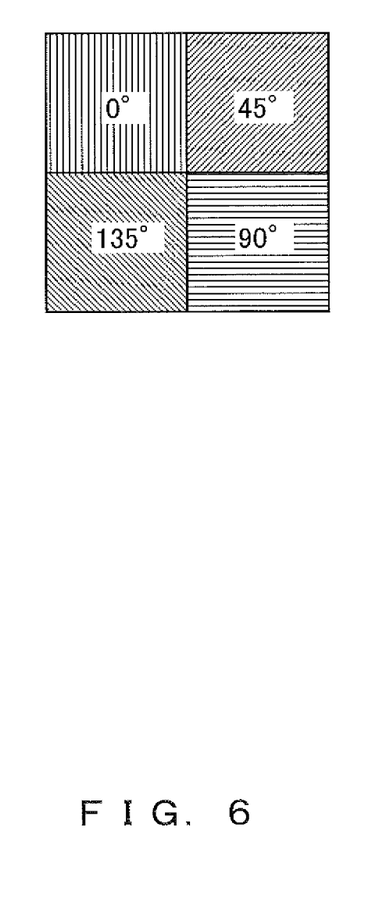
FIG. 6 illustrates a polarizing filter mounted on a multi-polarization camera.

The multi-polarization camera 3401 is a camera wherein, instead of RGB color filters that would be mounted on a typical color camera, polarizing filters with different angles as depicted in FIG. 6 are mounted on each pixel of an imager. Reflected light enters each pixel of an imager of the multi-polarization camera 3401 via any of the respective polarizing filters with polarization directions of 0 degree, 45 degrees, 90 degrees, and 135 degrees. In FIG. 5, 0 degrees indicates the polarization direction of the polarizing filter 3301-1; 90 degrees, a direction orthogonal to the polarization direction of the polarizing filter 3301-1. Mounting a polarizing filter such as that depicted in FIG. 6 on the multi-polarization camera 3401 allows the multi-polarization camera 3401 to concurrently capture images in different polarization states. The multi-polarization camera 3401 captures and outputs images in different polarization states (parallel polarization image and orthogonal polarization image) to the controlling circuit 3501.

According to the parallel polarization image and the orthogonal polarization image, the controlling circuit 3501 determines whether the subject is a biological body.

The biometric image capturing apparatus with the third exemplary configuration can simultaneously capture images in different polarization states without causing a parallax error.

Figure 7:
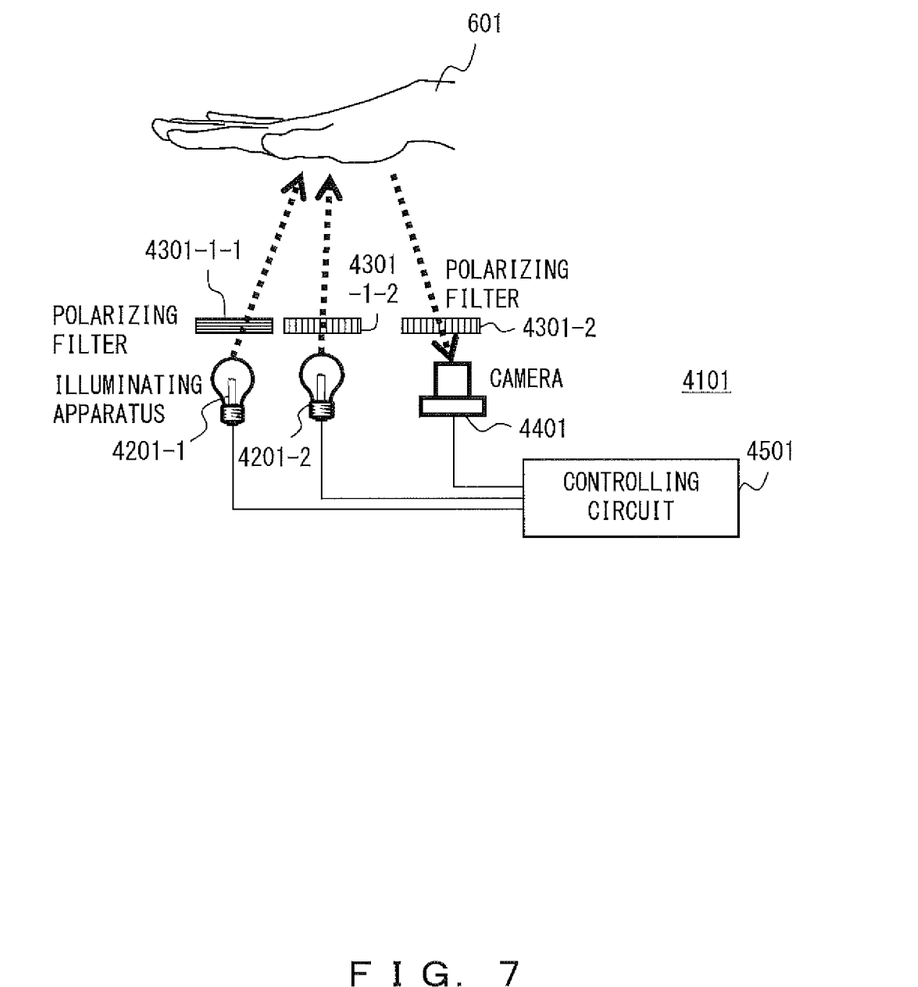
FIG. 7 illustrates a fourth exemplary configuration of a biometric image capturing apparatus in accordance with an embodiment.

FIG. 7 illustrates a fourth exemplary configuration of an image capturing apparatus in accordance with an embodiment.

A biometric image capturing apparatus 4101 includes illuminating apparatuses 4201-$i$, polarizing filters 4301-1-$i$ and 4301-2, a camera 4401, and a controlling circuit 4501.

The illuminating apparatuses 4201-$i$, the polarizing filters 4301-1-$i$, the polarizing filter 4301-2, the camera 4401, and the controlling circuit 4501 respectively correspond to the illuminating apparatus 201, the polarizing unit 301-1, the polarizing unit 301-2, the camera 401, and the controlling circuit 501 in FIG. 1.

The biometric image capturing apparatus 4101 with the fourth exemplary configuration captures images in different polarization states using the two illuminations 4201-1 and 4201-2.

The polarizing filter 4301-1-1 is disposed on an optical path between the illuminating apparatus 4201-1 and the subject 601. The polarizing filter 4301-1-2 is disposed on an optical path between the illuminating apparatus 4201-2 and the subject 601. The polarizing filter 4301-2 is disposed on an optical path between the subject 601 and the camera 4401.

The polarization direction of the polarizing filter 4301-1-1 is orthogonal to the polarization direction of the polarizing filter 4301-2. Hence, emitting light from the illuminating apparatus 4201-1 causes the polarizing filter 4301-1-1 to irradiate the subject 601 with linearly polarized light orthogonal to the polarization direction of the polarizing filter 4301-2. The controlling circuit 4501 causes only the illuminating apparatus 4201-1 to emit light traveling via the polarizing filter 4301-2 so as to cause the camera 4401 to capture the subject 601, thereby capturing an orthogonal polarization image.

The polarization direction of the polarization filter 4301-1-2 and the polarization direction of the polarizing filter 4301-2 are identical to each other (parallel to each other). Hence, emitting light from the illuminating apparatus 4201-2 causes the polarizing filter 4301-1-2 to irradiate the subject 601 with linearly polarized light parallel to the polarization direction of the polarizing filter 4301-2. The controlling circuit 4501 causes only the illuminating apparatus 4201-2 to emit light traveling via the polarizing filter 4301-2 so as to cause the camera 4401 to capture the subject 601, thereby capturing a parallel polarization image.

The camera 4401 captures and outputs images in different polarization states (a parallel polarization image and an orthogonal polarization image) to the controlling circuit 3501.

According to the parallel polarization image and the orthogonal polarization image, the controlling circuit 3501 determines whether the subject is a biological body.

Figure 8:
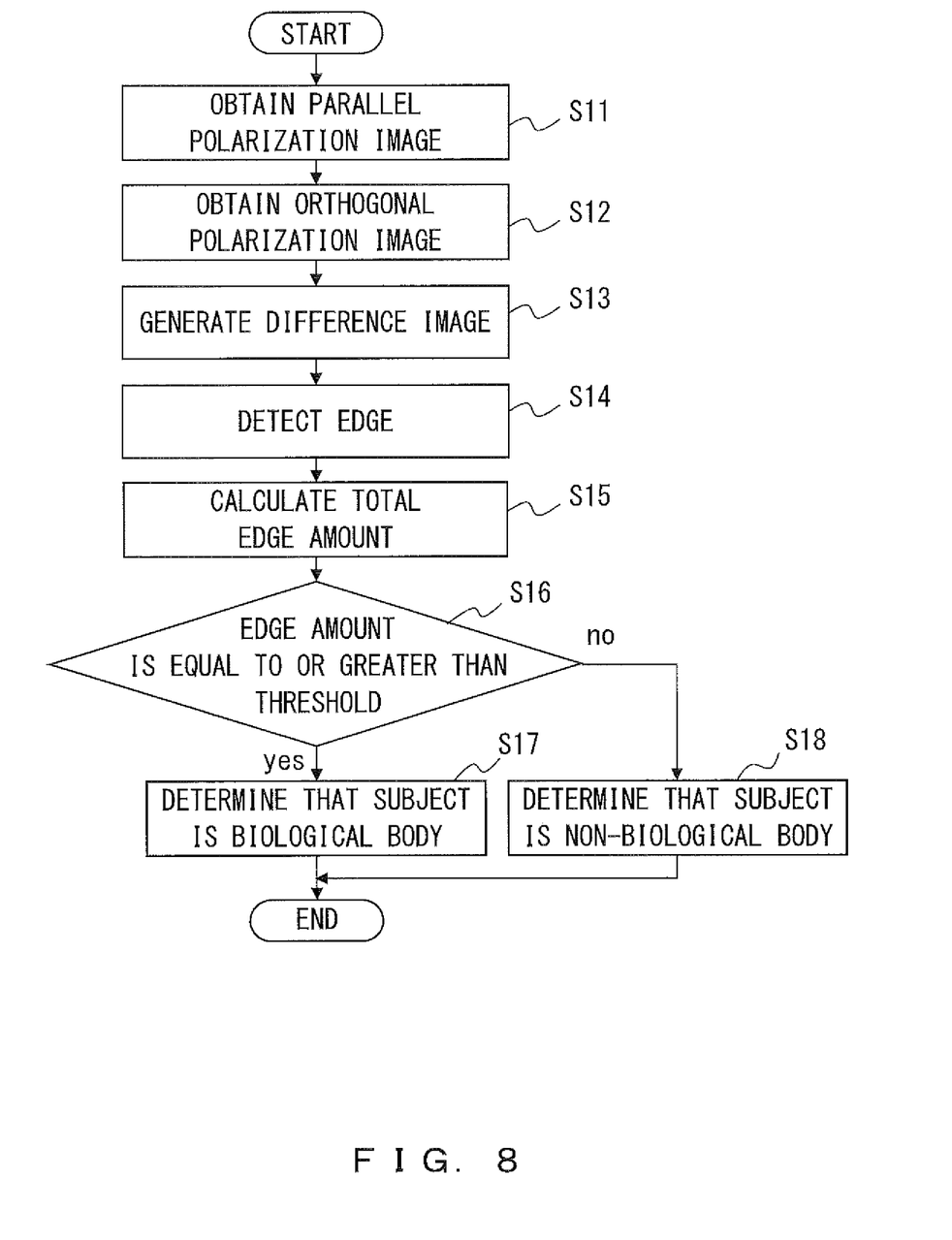
FIG. 8 is a flowchart of a biometric image capturing method in accordance with an embodiment.

FIG. 8 is a flowchart of a biometric image capturing method in accordance with an embodiment.

In step S11, the controlling unit 511 causes the illuminating apparatus 201 to be illuminated, and transmits an image capturing instruction to the camera 401. The generating unit 521 obtains a parallel polarization image from the camera 401. If necessary, the controlling unit 511 appropriately performs, for example, setting of the polarization direction of the polarizing unit 301-$i$. In the first exemplary configuration, the controlling circuit 1501 causes the illuminating apparatus 1201 to be illuminated, transmits an image capturing instruction to the cameras 1401-$i$, and obtains a parallel polarization image from the camera 1401-1. In the second exemplary configuration, the controlling circuit 2501 makes the polarization direction of the polarizing filter 2301-2 parallel to the polarization direction of the filter 2301-1. Then, the controlling circuit 2501 causes the illuminating apparatus 2201 to be illuminated, transmits an image capturing instruction to the camera 2401, and obtains a parallel polarization image from the camera 2401. In the third exemplary configuration, the controlling circuit 3501 causes the illuminating apparatus 3201 to be illuminated, transmits an image capturing instruction to the camera 3401, and obtains a parallel polarization image from among the images captured by the multi-polarization camera 3401. In the fourth exemplary configuration, the controlling circuit 4501 causes the illuminating apparatus 4201-2 to be illuminated, transmits an image capturing instruction to the camera 4401, and obtains a parallel polarization image. In the fourth exemplary configuration, the controlling circuit 4501 causes the illuminating apparatus 4201-2 to be illuminated, transmits an image capturing instruction to the camera 4401, and obtains a parallel polarization image. In this case, the controlling circuit 4501 does not cause the illuminating apparatus 4201-1 to be illuminated.

In step S12, the controlling unit 511 causes the illuminating apparatus 201 to be illuminated, and transmits an image capturing instruction to the camera 401. The generating unit 521 obtains an orthogonal polarization image from the camera 401. If necessary, the controlling unit 511 appropriately performs, for example, setting of the polarization direction of the polarizing unit 301-$i$. In the first exemplary configuration, the controlling circuit 2501 obtains the orthogonal polarization image captured by the camera 1401-2 in step S11. In the second exemplary configuration, the controlling circuit 2501 makes the polarization direction of the polarizing filter 2301-2 orthogonal to the polarization direction of the filter 2301-1. Then, the controlling circuit 2501 causes the illuminating apparatus 2201 to be illuminated, transmits an image capturing instruction to the camera 2401, and obtains an orthogonal polarization image from the camera 2401. In the third exemplary configuration, the controlling circuit 3501 obtains an orthogonal polarization image from among the images captured by the multi-polarization camera 3401 in step S11. In the fourth exemplary configuration, the controlling circuit 4501 causes the illuminating apparatus 4201-1 to be illuminated, transmits an image capturing instruction to the camera 4401, and obtains an orthogonal polarization image. In this case, the controlling circuit 4501 does not cause the illuminating apparatus 4201-2 to be illuminated. An order may be reversed in which steps S11 and S12 are performed.

In step S13, the generating unit 521 calculates a difference between the pixel value of each pixel of the parallel polarization image and the pixel value of each pixel of the orthogonal polarization image, and generates a difference image of pixels each with a pixel value equal to the calculated difference.

Figure 9:
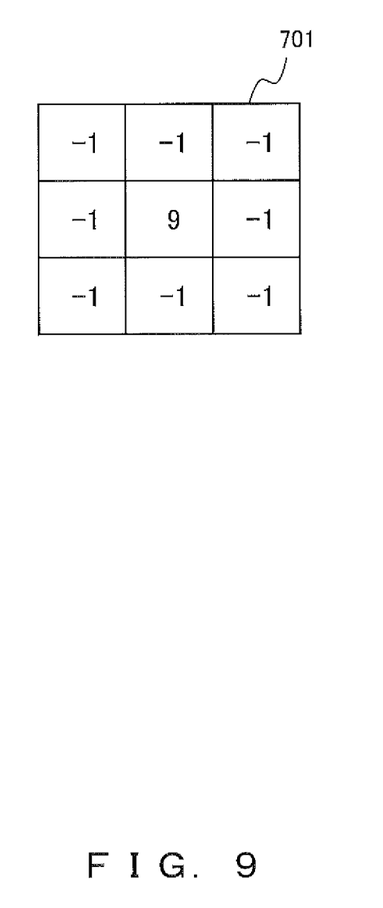
FIG. 9 illustrates a high-pass filter.

In step S14, the determining unit 531 generates an edge image through edge detection on the difference image. In particular, the determining unit 531 calculates the pixel value (edge strength) of each pixel of the edge image through a differential operation on the difference image so as to generate the edge image. For example, in the differential operation, the determining unit 531 may use a high-pass filter 701 depicted in FIG. 9. The pixel value of each pixel of the edge image is determined as follows. For the difference image, the determining unit 531 multiplies the high-pass filter 701 depicted in FIG. 9 by the pixel value of a pixel for which a pixel value is to be determined and the pixel values of adjacent pixels, and defines the sum of the results of the multiplication of each pixel as the pixel value of the edge image for the determined pixel.

Figure 10:
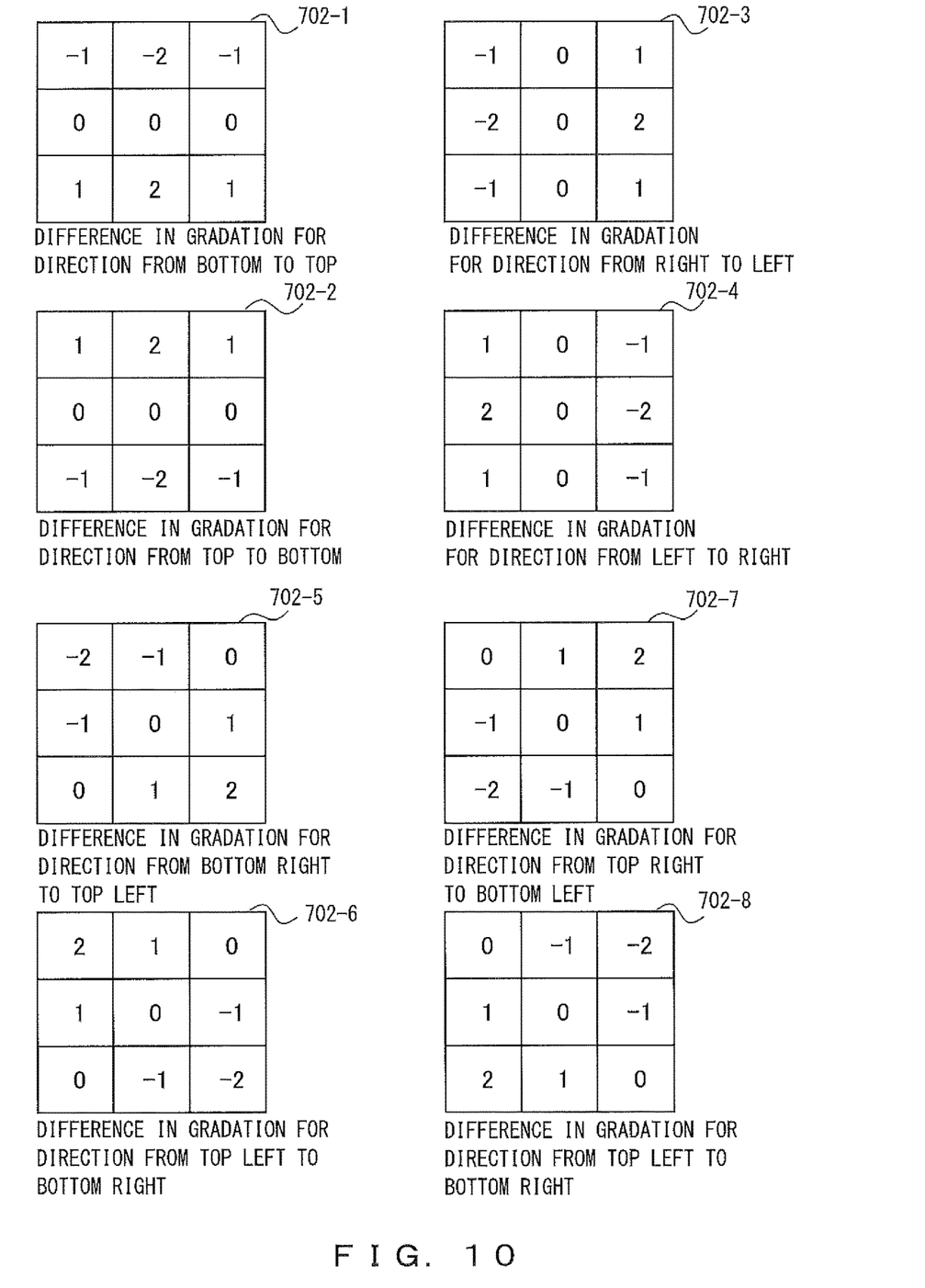
FIG. 10 illustrates a sobel filter.

A difference image indicates nonuniformity of a polarization state. Patterns of wrinkles are locally formed on the surface of a biological body. Such banded patterns are locally and clearly formed in a particular direction, and hence, instead of performing simple edge detection, a sobel filter (FIG. 10), which calculates a spatial first differentiation, or a two-dimensional Gabor filter, which detects a direction, may be used. Use of a sobel filter or a filter for detecting a direction, such as a two-dimensional Gabor filter, may enable more precise determinations. Sobel filters 702-1 to 702-8 illustrated in FIG. 10 are filters used to detect edges by respectively calculating differences in gradation for directions from bottom to top, from top to bottom, from right to left, from left to right, from bottom right to top left, from top left to bottom right, from top right to bottom left, and from top left to bottom right. Using the sobel filters 702-1 to 702-8 illustrated in FIG. 10, the determining unit 531 may generate eight edge images indicating edges for eight directions. The method of calculating an edge image for each direction using the sobel filters 702-1 to 702-8 is similar to the above-described method of calculating an edge image using the high-pass filter 701.

In step S15, the determining unit 531 calculates a total edge amount that is the sum of the pixel values (edge strengths) of the pixels of the edge image. When the sobel filters 702-1 to 702-8 illustrated in FIG. 10 are used, the sum of the pixel values of the pixels of the eight edge images, i.e., edge images for the directions, is calculated as a total edge amount.

In step S16, the determining unit 531 determines whether the total edge amount is equal to or greater than a threshold. When the total edge amount is equal to or greater than the threshold, the control shifts to step S17; otherwise, the control shifts to step S18. The threshold may be unfixed and changed through learning.

In step S17, the determining unit 531 determines that the subject is a biological body.

In step S18, the determining unit 531 determines that the subject is a non-biological body.

As described above, when a parallel polarization image and an orthogonal polarization image each with a different polarization state are compared with each other, these two polarization images indicate different luminance distributions because a biological body indicates a dichromatic reflection property resulting from surface-reflected light and internally diffused light. In the case of a non-biological body, two polarization images indicate the same luminance distribution. Accordingly, the biometric image capturing apparatus 101 determines through edge detection the distribution of the polarization state of reflected light based on the polarization property of skin (anisotropic scattering), and determines whether the subject is a biological body.

The biometric image capturing method described above uses a difference between a parallel polarization image and an orthogonal polarization image, but the ratio between the parallel polarization image and the orthogonal polarization image may be used. In particular, in step S13, the generating unit 521 may divide the pixel value of each pixel of the parallel polarization image by the pixel value of each pixel of the orthogonal polarization image, thereby generating a division image of pixels each with a pixel value equal to the result of the division. The generating unit 521 may divide the pixel value of each pixel of the orthogonal polarization image by the pixel value of each pixel of the parallel polarization image, thereby generating a division image. In this case, edge detection on the division image, not the difference image, is performed in step S14.

The biometric image capturing method described above uses edge detection to determine whether a sample is a biological body. However, as long as deviation of a luminance distribution can be determined, another method may be used. For example, the determining unit 531 may calculate the high-frequency content of the spatial frequency of an image through, for example, Fourier transform of a difference image; when the high-frequency content is equal to or greater than a predetermined value, the determining unit 531 may determine that the subject is a biological body.

The image capturing apparatus in accordance with the embodiment is capable of improving an accuracy of determining whether a subject is a biological body.

Figure 11:
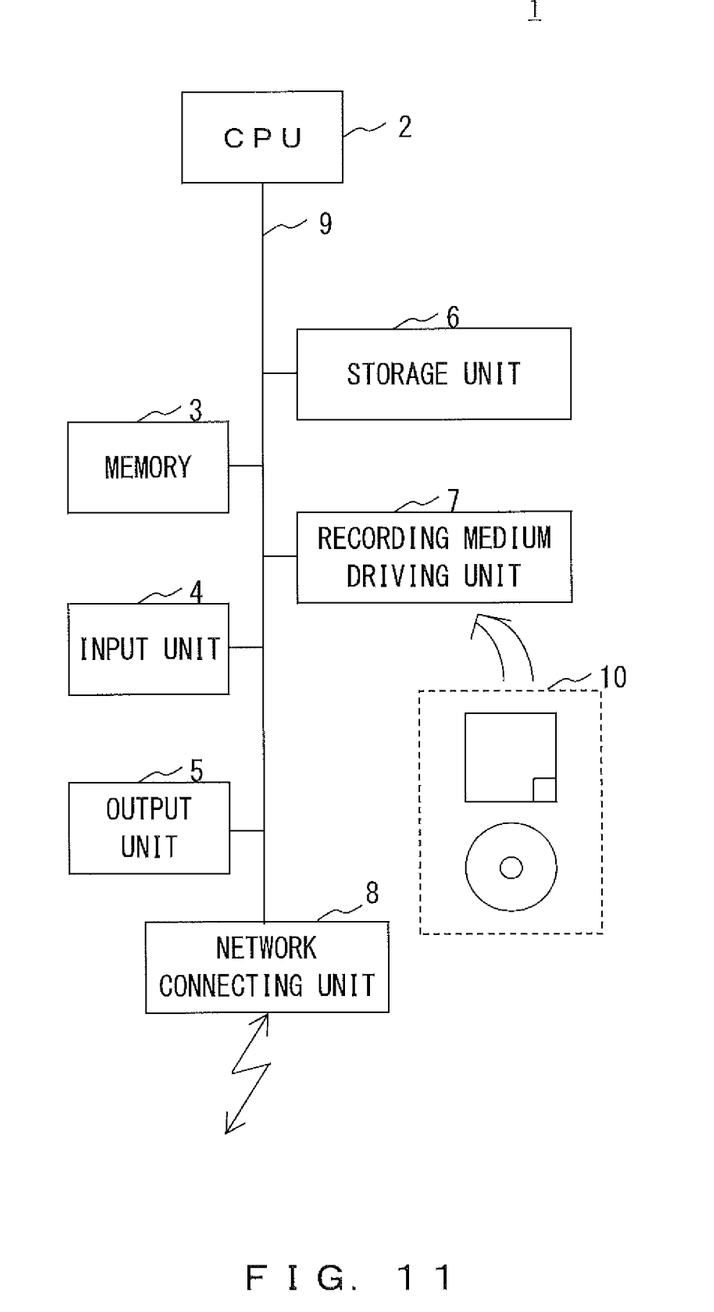
FIG. 11 is a configuration diagram of an information processing apparatus (computer).

FIG. 11 is a configuration diagram of an information processing apparatus (computer).

A biometric image capturing apparatus 101 in accordance with an embodiment may be achieved by, for example, an information processing apparatus 1 depicted in FIG. 11.

The information processing apparatus 1 includes a CPU 2, a memory 3, an input unit 4, an output unit 5, a storage unit 6, a recording medium driving unit 7, and a network connecting unit 8, all of which are connected to each other by a bus 9.

The CPU 2 is a central processor that controls the entirety of the information processing apparatus 1. The CPU 2 corresponds to the controlling circuit 501.

The memory 3 is a memory such as a Read Only Memory (ROM) or a Random Access Memory (RAM) that, in program execution, temporarily stores a program or data stored in the storage unit 6 (or a portable recording medium 10). The CPU 2 performs the various processes described above by executing a program using the memory 3.

In this case, a program code itself read from, for example, the portable recording medium 10 achieves functions of the embodiment.

The input unit 4 is, for example, a keyboard, a mouse, a touch panel, or a camera, and is used to, for example, input information or an instruction from a user or an operator and obtain data to be used for the information processing apparatus 1. The input unit 4 corresponds to the camera 401.

The output unit 5 is, for example, a display, a printer, or an illuminating apparatus. The output unit 5 is an apparatus that outputs a query or a result of processing to a user or an operator and that is operated under the control of the CPU 2. The output unit 5 corresponds to the illuminating apparatus 201 and the polarizing unit 301-$i$.

The storage unit 6 is, for example, a magnetic disk apparatus, an optical disk apparatus, or a tape apparatus. The information processing apparatus 1 stores the program and data described above in the storage unit 6 and loads them into the memory 3 for use on an as-needed basis.

The recording medium driving unit 7 drives the portable recording medium 10 and accesses data recorded therein. An arbitrary computer-readable recording medium such as a memory card, a flexible disk, a Compact Disk Read Only Memory (CD-ROM), an optical disk, or a magnetic optical disk is used as the portable recording medium. The user stores the program and data described above in the portable recording medium 10 and loads them into the memory 3 for use on an as-needed basis.

The network connecting unit 8 is connected to arbitrary communication networks such as a Local Area Network (LAN) or a Wide Area Network (WAN) and performs data conversion associated with communications.

All examples and conditional language provided herein are intended for pedagogical purposes to aiding the reader in understanding the invention and the concepts contributed by the inventor to further the art, and are not to be construed as being limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A biometric image capturing apparatus comprising:
    an illuminating apparatus which irradiates a subject with light;
    a camera configured to capture an image of the subject;
    a first polarizing filter, disposed on a first optical path between the illuminating apparatus and the subject, which allows passage of the light from the illuminating apparatus onto the subject;
    a second polarizing filter, disposed on a second optical path between the subject and the camera, which allows passage of the light reflecting from the subject in a first polarization direction and in a second polarization direction, the first and second polarization directions being different; and
    a processor configured to
        perform a computation to obtain a difference between a pixel value of each pixel of a first image, captured by the camera according to the light in the first polarization direction that has passed through the second polarizing filter, and a corresponding pixel value of each pixel of a second image captured by the camera according to the light in the second polarization direction that has passed through the second polarizing filter,
        generate a difference image from the difference between each pixel of the first and second images,
        generate a plurality of edge images indicating edges for a plurality of directions by performing edge detection on the difference image using a plurality of filters detecting the edges for the plurality of directions,
        calculate a sum of pixel values of pixels for each of the plurality of edge images,
        calculate, as a total edge amount, a total of sums of the pixel values calculated for the plurality of the edge images, and
        determine the subject is a biological body according to the total edge amount being equal to or greater than a threshold.

2. The biometric image capturing apparatus according to claim 1, wherein the first polarization direction and the second polarization direction are orthogonal to each other.

3. The biometric image capturing apparatus according to claim 1, wherein the second polarizing filter is rotatable and provides a polarization direction settable in accordance with a rotation angle.

4. A biometric image capturing method comprising:
    irradiating, by an illuminating apparatus, a subject with light;
    capturing, by a camera, an image of the subject;
    performing a computation by a processor to obtain a difference between a pixel value of each pixel of a first image, captured by the camera according to light in first polarization direction that has passed through a first polarizing filter disposed on a first optical path between the illuminating apparatus and the subject and through a second polarizing filter, disposed on a second optical path between the subject and the camera, and a corresponding pixel value of each pixel of a second image captured by the camera according to light in a second polarization direction that has passed through the second polarizing filter;
    generating a difference image from the difference between each pixel of the first and second images;
    generating a plurality of edge images indicating edges for a plurality of directions by performing edge detection on the difference image using a plurality of filters detecting the edges for the plurality of directions;
    calculating a sum of pixel values of pixels for each of the plurality of edge images,
    calculating, as a total edge amount, a total of sums of the pixel values calculated for the plurality of edge images, and
    determine the subject is a biological body according to the calculated total edge amount being equal to or greater than a threshold.

5. The biometric image capturing method according to claim 4, wherein the first polarization direction and the second polarization direction are orthogonal to each other.

6. The biometric image capturing method according to claim 4, wherein the second polarizing filter is rotatable and provides a polarization direction settable in accordance with a rotation angle.

* * * * *